(12) United States Patent
Mori et al.

(10) Patent No.: US 9,810,281 B2
(45) Date of Patent: Nov. 7, 2017

(54) DAMPING FORCE CONTROL TYPE SHOCK ABSORBER

(71) Applicant: HITACHI AUTOMOTIVE SYSTEMS, LTD., Ibaraki (JP)

(72) Inventors: Shunsuke Mori, Yokohama (JP); Fumiyuki Yamaoka, Sagamihara (JP); Mikio Yamashita, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/910,823

(22) PCT Filed: Aug. 11, 2014

(86) PCT No.: PCT/JP2014/071204
§ 371 (c)(1),
(2) Date: Feb. 8, 2016

(87) PCT Pub. No.: WO2015/020227
PCT Pub. Date: Feb. 12, 2015

(65) Prior Publication Data
US 2016/0195152 A1    Jul. 7, 2016

(30) Foreign Application Priority Data
Aug. 9, 2013    (JP) .................................. 2013/166592

(51) Int. Cl.
*F16F 9/46*    (2006.01)

(52) U.S. Cl.
CPC .................... *F16F 9/465* (2013.01)

(58) Field of Classification Search
CPC .... F16F 9/348; F16F 9/46; F16F 9/464; F16F 9/465; F16F 2230/24
See application file for complete search history.

(56) References Cited

U.S. PATENT DOCUMENTS

| 2011/0073424 A1 | 3/2011 | Murakami |
| 2011/0147147 A1* | 6/2011 | Murakami .............. F16F 9/464 |
| | | 188/314 |

(Continued)

FOREIGN PATENT DOCUMENTS

| JP | 2011-75060 | 4/2011 |
| JP | 2013-11342 | 1/2013 |

(Continued)

OTHER PUBLICATIONS

International Search Report dated Sep. 2, 2014 in corresponding International Application No. PCT/JP2014/071204.

*Primary Examiner* — Vishal Sahni
(74) *Attorney, Agent, or Firm* — Wenderoth, Lind & Ponack, L.L.P.

(57) ABSTRACT

PROBLEM
Provided is a damping force control type shock absorber capable of obtaining an appropriate damping force even in the event of a failure independently of the stoke of a valving element of a solenoid valve.
MEANS FOR SOLVING
A piston 5 having a piston rod 6 connected thereto is fitted in a cylinder 2 having hydraulic oil sealed therein, and a flow of hydraulic oil induced by movement of the piston 5 is controlled by a damping force generating mechanism 26 to generate a damping force. In the damping force generating mechanism 26, damping force is generated by a pilot-type main valve 27 and a normally-open pilot valve 28 which is a solenoid valve, and the damping force is adjusted by energization of a coil 37. A fail-safe valve 100 is provided downstream of the pilot valve 28. During normal operations, the fail-safe valve 100 opens the flow path through excitation of the coil 37 of the pilot valve 28. In the event of a failure, due to loss of excitation, the fail-safe valve 100

(Continued)

restricts the flow path to generate an appropriate damping force in place of the pilot valve 28, which has become inoperable.

4 Claims, 8 Drawing Sheets

(56) References Cited

U.S. PATENT DOCUMENTS

| | | |
|---|---|---|
| 2012/0305349 A1 | 12/2012 | Murakami et al. |
| 2012/0325603 A1* | 12/2012 | Ootake .................. F16F 9/465 188/322.13 |
| 2013/0275003 A1 | 10/2013 | Uchino et al. |
| 2014/0182696 A1* | 7/2014 | Wimmer ............. F15B 11/0445 137/14 |

FOREIGN PATENT DOCUMENTS

| | | |
|---|---|---|
| JP | 2013-87804 | 5/2013 |
| WO | 2012/105556 | 8/2012 |

\* cited by examiner

DAMPING FORCE CONTROL TYPE SHOCK ABSORBER

TECHNICAL FIELD

The present invention relates to a damping force control type shock absorber generating a damping force by controlling the flow of a fluid in relation to the stroke of a piston rod and capable of adjusting the damping force.

BACKGROUND ART

In general, a shock absorber attached to a suspension system of an automobile or other vehicle has a cylinder having a fluid sealed therein and a piston connected with a piston rod, which is slidably fitted in the cylinder. The shock absorber further has a damping force generating mechanism comprising an orifice, a disk valve, etc. to generate a damping force by controlling a flow of fluid induced by sliding movement of the piston in the cylinder in relation to the stroke of the piston rod.

In a pilot-type hydraulic shock absorber disclosed in Patent Literature 1, for example, a back-pressure chamber (pilot chamber) is formed at the back of a main disk valve constituting a damping force generating mechanism. A fluid is introduced into the back-pressure chamber to apply the pressure in the back-pressure chamber to the main disk valve in the direction for closing the valve, and the pressure in the back-pressure chamber is adjusted with a solenoid valve (pilot valve), thereby controlling the valve-opening operation of the main disk valve. With this structure, it is possible to increase the degree of freedom for adjusting damping force characteristics.

In the hydraulic shock absorber disclosed in the Patent Literature 1, if it should become impossible to energize the solenoid valve, the valving element of the solenoid valve is moved to a fail-safe position by the spring force of a valve spring to abut against a fail-safe valve, thereby adjusting the flow path area mechanically with the fail-safe valve in place of the solenoid valve. Thus, an appropriate damping force can be obtained even in the event of a failure.

CITATION LIST

Patent Literature

PATENT LITERATURE 1: Japanese Patent Application Laid-Open Publication No. 2011-75060

SUMMARY OF INVENTION

Technical Problem

In a shock absorber in which the fail-safe valve is selectively opened and closed by the movement of the valving element of the solenoid valve, as is disclosed in the above-mentioned Patent Literature 1, the stroke of the valving element of the solenoid valve needs to be increased to some extent, which greatly restricts the space available.

The present invention has been made in view of the above-described circumstances, and an object of the present invention is to provide a pilot-type and damping force control type shock absorber capable of obtaining an appropriate damping force even in the event of a failure independently of the stoke of the valving element of the solenoid valve.

Solution to Problem

To solve the above-described problem, the present invention provides a damping force control type shock absorber including a cylinder having a hydraulic fluid sealed therein, a piston slidably fitted in the cylinder, a piston rod connected to the piston and extended to the outside of the cylinder, and a damping force generating mechanism generating a damping force by controlling a flow of hydraulic fluid induced by sliding movement of the piston in the cylinder. The damping force generating mechanism includes a normally-open solenoid valve operated by energization of a coil to control the flow of hydraulic fluid, and a fail-safe valve provided upstream or downstream of the solenoid valve. The fail-safe valve has a valving element movable between a normal position where the valving element opens a flow path of the hydraulic fluid and a fail-safe position where the valving element controls the flow of hydraulic fluid to generate a damping force. The fail-safe valve further has a seat part with respect to which the valving element selectively seats and unseats, a guide part movably guiding the valving element, an urging member urging the valving element toward the fail-safe position, and a magnetic attraction part magnetically attracting the valving element through the magnetic field of the coil to move the valving element to the normal position. The seat part and the guide part are made of a non-magnetic material not forming a magnetic path through the magnetic field of the coil, and the valving element and the magnetic attraction part are made of a magnetic material forming a magnetic path through the magnetic field of the coil.

Advantageous Effects of Invention

The damping force control type shock absorber according to the present invention can obtain an appropriate damping force even in the event of a failure independently of the stroke of the valving element of the solenoid valve.

DESCRIPTION OF EMBODIMENTS

Embodiments of the present invention will be explained below in detail with reference to the accompanying drawings.

Figure 1:
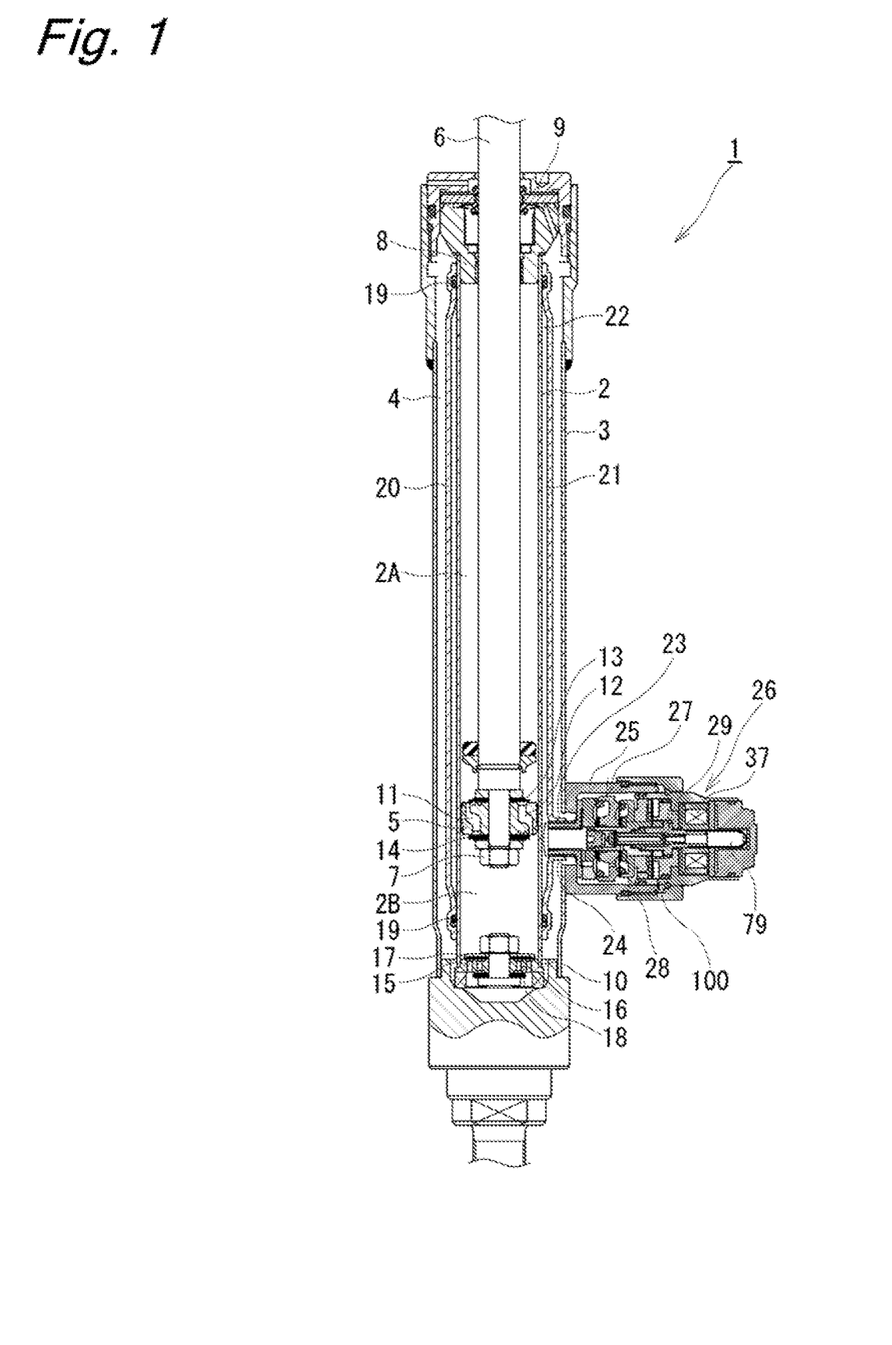
FIG. 1 is a vertical sectional view of a damping force control type shock absorber according to a first embodiment of the present invention.

As shown in FIG. 1, a damping force control type shock absorber 1 according to a first embodiment of the present invention has a dual-tube structure comprising a cylinder 2 and an outer tube 3 provided around the outside of the cylinder 2. A reservoir 4 is formed between the cylinder 2 and the outer tube 3. The cylinder 2 has a piston 5 slidably fitted therein. The piston 5 divides the interior of the cylinder 2 to define two chambers, i.e. a cylinder upper chamber 2A and a cylinder lower chamber 2B. One end of a piston rod 6 is connected to the piston 5 with a nut 7. The other end of the piston rod 6 extends through the cylinder upper chamber 2A and further extends to the outside of the cylinder 2 through a rod guide 8 and an oil seal 9, which are fitted to the upper end portion of the dual-tube structure comprising the cylinder 2 and the outer tube 3. The lower end portion of the cylinder 2 is provided with a base valve 10 dividing the cylinder lower chamber 2B and the reservoir 4 from each other.

The piston 5 is provided with passages 11 and 12 communicating between the cylinder upper and lower chambers 2A and 2B. The passage 12 is provided with a check valve 13 allowing only a flow of fluid from the cylinder lower chamber 2B toward the cylinder upper chamber 2A. The set load of the check valve 13 is so small that the check valve 13 opens the moment that the stroke of the piston rod 6 changes from the extension stroke to the compression stroke. The passage 11 is provided with a disk valve 14 that opens when the fluid pressure in the cylinder upper chamber 2A reaches a predetermined pressure during the extension stroke to relieve the fluid pressure in the cylinder upper chamber 2A to the cylinder lower chamber 2B. The valve-opening pressure of the disk valve 14 is set very high so that the disk valve 14 does not open during running on an ordinary road surface. The disk valve 14 is provided with an orifice (not shown) constantly communicating between the cylinder upper and lower chambers 2A and 2B.

The base valve 10 is provided with passages 15 and 16 communicating between the cylinder lower chamber 2B and the reservoir 4. The passage 15 is provided with a check valve 17 allowing only a flow of fluid from the reservoir 4 toward the cylinder lower chamber 2B. The set load of the check valve 17 is so small that the check valve 17 opens the moment that the stroke of the piston rod 6 changes from the compression stroke to the extension stroke. The passage 16 is provided with a disk valve 18 that opens when the fluid pressure in the cylinder lower chamber 2B reaches a predetermined pressure to relieve the fluid pressure in the cylinder lower chamber 2B to the reservoir 4. The valve-opening pressure of the disk valve 18 is set very high so that the disk valve 18 does not open during running on an ordinary road surface. The disk valve 18 is provided with an orifice (not shown) constantly communicating between the cylinder lower chamber 2B and the reservoir 4. As hydraulic fluid, hydraulic oil is sealed in the cylinder 2, and the hydraulic oil and gas are sealed in the reservoir 4.

The cylinder 2 has a separator tube 20 fitted thereover with seal members 19 interposed therebetween at the upper and lower ends of the cylinder 2. Thus, an annular passage 21 is formed between the cylinder 2 and the separator tube 20. The annular passage 21 is communicated with the cylinder upper chamber 2A through a passage 22 provided in a side wall of the cylinder 2 near the upper end thereof. It should be noted that there may be provided a plurality of circumferentially or axially spaced passages 22 according to the specifications. The separator tube 20 has a circular cylindrical connecting opening 23 projecting sideward from a lower end part thereof. The side wall of the outer tube 3 is provided with an opening 24 in concentric relation to the connecting opening 23. The opening 24 is larger in diameter than the connecting opening 23. A circular cylindrical casing 25 is joined by welding or the like to the side wall of the outer tube 3 in such a manner as to surround the opening 24. A damping force generating mechanism 26 is installed in the casing 25.

Figure 2:
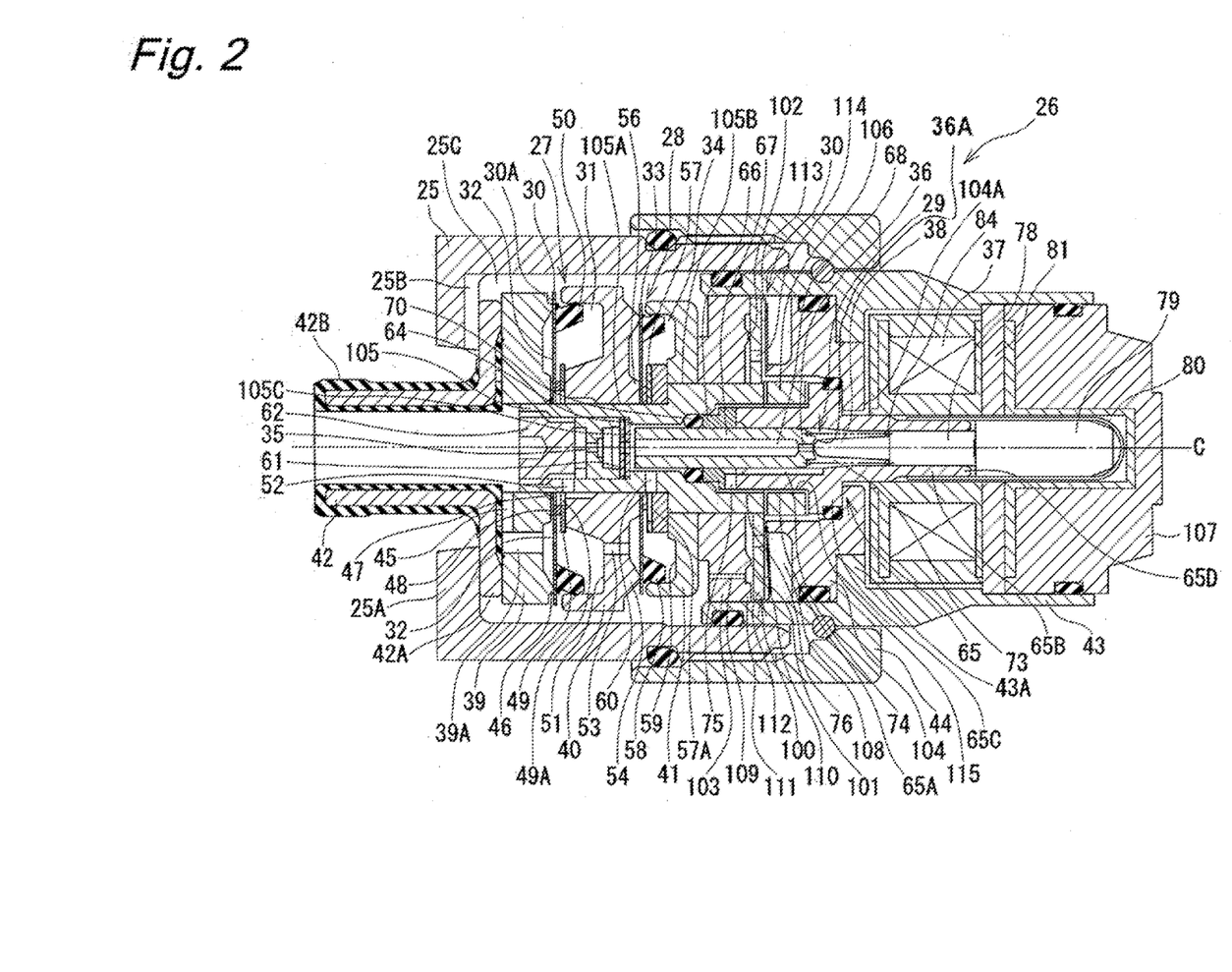
FIG. 2 is an enlarged vertical sectional view of a damping force generating mechanism as an important part of the damping force control type shock absorber shown in FIG. 1.

Next, the damping force generating mechanism 26 will be explained with reference mainly to FIG. 2.

The damping force generating mechanism 26 has a pilot-type main valve 27, a pilot-type control valve 28, a pilot valve 29 which is a solenoid valve, and a fail-safe valve 100.

The main valve 27 has a disk valve 30 that opens upon receiving the pressure of hydraulic oil in the cylinder upper chamber 2A to allow the hydraulic oil to flow toward the reservoir 4. The main valve 27 further has a pilot chamber 31 that applies the pressure therein to the disk valve 30 in the direction for closing the disk valve 30. The pilot chamber 31 is connected to the cylinder upper chamber 2A through a fixed orifice 32 and also connected to the reservoir 4 through the control valve 28. The disk valve 30 is provided with an orifice 30A constantly connecting between the cylinder upper chamber 2A and the reservoir 4.

The control valve 28 has a disk valve 33 that opens upon receiving the pressure of hydraulic oil in the pilot chamber 31 to allow the hydraulic oil to flow toward the reservoir 4. The control valve 28 further has a pilot chamber 34 that applies the pressure therein to the disk valve 33 in the direction for closing the disk valve 33. The pilot chamber 34 is connected to the cylinder upper chamber 2A through a fixed orifice 61 and also connected to the reservoir 4 through the pilot valve 29.

The pilot valve 29 is a normally-open pressure control valve configured to adjust the pressure in the pilot chamber 34 of the control valve 28 by restricting the flow path with a small-diameter port 36 and selectively opening and closing the port 36 with a valving element 38 connected to an armature 79 serving as a movable element driven by a coil 37 in such a manner that the armature 79 is magnetically attracted to a magnetic attraction part 65D of a guide member 65. It should be noted that the port 36 is reduced in diameter to reduce the pressure-receiving area of the valving element 38, thereby making it possible to increase the pressure obtained when the pilot valve 29 is closed with the maximum electric current. Consequently, it is possible to increase the differential pressure obtained from the difference in the magnitude of electric current, and hence possible to increase the variable width of damping force characteristics.

The fail-safe valve 100 is disposed downstream of the pilot valve 29, i.e. between the pilot valve 29 and the reservoir 4 to operate in response to excitation of the coil 37 caused by energization. When the coil 37 is energized (during normal operations), the fail-safe valve 100 is moved to a normal position shown below a center line C in FIG. 2 in response to excitation of the coil 37 against the spring force of a fail-safe spring 101 as an urging member to open the flow path to the reservoir 4. When the coil 37 is not energized (in the event of a failure), the fail-safe valve 100 is moved to a fail-safe position shown above the center line C in FIG. 2 by the spring force of the fail-safe spring 101 to restrict the flow path to the reservoir 4 by a fail-safe orifice 102.

Next, a specific structure of the damping force generating mechanism 26 will be explained in more detail.

In a casing 25 are disposed a main body 39, a control body 40, a pilot chamber member 41, a fail-safe body 103, an insulating member 104, a pilot member 105, and a guide member 65 as a stator, together with a passage member 42. The main body 39, the control body 40, the pilot chamber member 41, and the fail-safe body 103 incorporate the main valve 27, the control valve 28, the pilot valve 29, and the fail-safe valve 100, respectively. A solenoid case 43 is secured to an opening end of the casing 25 with a nut 44, thereby sealing the interior of the casing 25 and securing the above-described components to the casing 25.

The passage member 42 is a circular cylindrical member having a flange portion 42A around the outer periphery of one end thereof. The flange portion 42A abuts against an inward flange portion 25A of the casing 25, and a circular cylindrical portion 42B of the passage member 42 is liquid-tightly inserted into the connecting opening 23 of the separator tube 20. In this way, the passage member 42 is connected to the annular passage 21. The inward flange portion 25A of the casing 25 has a radially extending passage groove 25B. The reservoir 4 and a chamber 25C in the casing 25 are communicated with each other through the passage groove 25B and the opening 24 of the outer tube 3.

The main body 39, the control body 40, the pilot chamber member 41, the fail-safe body 103, and the insulating member 104 are each formed in a substantially annular shape. The pilot member 105 is formed in the shape of a stepped substantially circular cylinder having a small-diameter portion 105A and a large-diameter portion 105B. The guide member 65 is formed in the shape of a stepped circular cylinder, which has a small-diameter port press-fit portion 65A at one end thereof and a small-diameter plunger-guide portion 65B at the other end thereof. The guide member 65 further has a large-diameter portion 65C in the middle thereof. The small-diameter portion 105A of the pilot member 105 is fitted to the main body 39 and the control body 40, and the large-diameter portion 105B thereof is fitted to the pilot chamber member 41 and the fail-safe body 103. The outer peripheral portion of the fail-safe body 103 is fitted into the solenoid case 43. The port press-fit portion 65A of the guide member 65 is fitted into the large-diameter portion 105B of the pilot member 105, and the large-diameter portion 65C thereof is fitted into the insulating member 104. The large-diameter portion 65C abuts at an end thereof against an inward flange portion 104A of the insulating member 104. The plunger-guide portion 65B extends through the inward flange portion 104A. The insulating member 104 is fitted at an outer peripheral portion thereof into the solenoid case 43 and abuts at an end thereof against a flange portion 43A of the solenoid case 43. Between the large-diameter portion 105B of the pilot member 105 and the end of the large-diameter portion 65C of the guide member 65 is interposed an annular anchor 106 to which the port press-fit portion 65A of the guide member 65 is fitted.

The main body 39 is provided with a plurality of circumferentially spaced passages 39A axially extending therethrough. The passages 39A communicate with the passage member 42 through a recess 45 formed at one end of the main body 39. The other end of the main body 39 has an annular seat portion 46 projecting at the outer peripheral side of the openings of the passages 39A and further has an annular clamp portion 47 projecting at the inner peripheral side of the openings of the passages 39A. The disk valve 30, which constitutes the main valve 27, is seated at an outer peripheral portion thereof on the seat portion 46 of the main body 39. The inner peripheral portion of the disk valve 30 is clamped, together with an annular retainer 48 and a washer 49, between the clamp portion 47 and the control body 40. The disk valve 30 has an annular elastic seal member 50 fixed to an outer peripheral portion of the rear side thereof. The elastic seal member 50 is made of an elastic material, e.g. rubber, and fixed to the disk valve 30 by a fixing method, e.g. vulcanizing bonding. The disk valve 30 has a notch formed on the outer peripheral portion thereof. The notch constitutes an orifice 30A constantly communicating between the passages 39A and the chamber 25C in the casing 25. The disk valve 30 may comprise pliable disk-shaped valving elements stacked appropriately so that desired flexibility characteristics can be obtained. Further, an orifice may be formed by coining the seat portion 46 instead of forming the orifice 30A by providing a notch in the disk valve 30.

The control body 40 has an annular recess 51 formed at one end thereof. The outer peripheral portion of the elastic seal member 50 fixed to the disk valve 30 is slidably and liquid-tightly fitted in the recess 51 to form the pilot chamber 31 in the recess 51. The disk valve 30 lifts from the seat portion 46 to open upon receiving the pressure in the passages 39A, thereby allowing the passages 39A to communicate with the chamber 25C in the casing 25. The pressure in the pilot chamber 31 acts on the disk valve 30 in the direction for closing the disk valve 30. The pilot chamber 31 communicates with the passages 39A through the fixed orifice 32 provided in the disk valve 30 and further communicates with the passage member 42.

The control body 40 is provided with a plurality of circumferentially spaced passages 53 axially extending therethrough to communicate at one end thereof with the pilot chamber 31. The other end of the control body 40 has an annular seat portion 54 projecting at the outer peripheral side of the openings of the circumferentially spaced passages 53. Further, the other end of the control body 40 has an annular clamp portion 56 projecting at the inner peripheral side of the openings of the circumferentially spaced passages 53. A disk valve 33 constituting the control valve 28 is seated on the seat portion 54. The inner peripheral portion of the disk valve 33 is clamped, together with a plurality of washers 57, between the clamp portion 56 and the large-diameter portion 105B of the pilot member 105. The disk valve 33 has an annular elastic seal member 58 fixed to an outer peripheral portion of the rear side thereof. The elastic seal member 58 is made of an elastic material, e.g. rubber, and fixed to the disk valve 33 by a fixing method, e.g. vulcanizing bonding. The disk valve 33 may comprise pliable disk-shaped valving elements stacked appropriately so that desired flexibility characteristics can be obtained.

The pilot chamber member 41 has an annular recess 59 formed at one end thereof. The outer peripheral portion of the elastic seal member 58 fixed to the disk valve 33 is slidably and liquid-tightly fitted in the annular recess 59 to form the pilot chamber 34 in the recess 59. The disk valve 33 lifts from the seat portion 54 to open upon receiving the pressure in the passages 53, which communicate with the pilot chamber 31 of the main valve 27, thereby allowing the passages 53 to communicate with the chamber 25C in the casing 25. The pressure in the pilot chamber 34 acts on the disk valve 33 in the direction for closing the disk valve 33.

The pilot chamber 34 communicates with a passage 105C in the pilot member 105 through a passage 60 provided in the side wall of the small-diameter portion 105A of the pilot member 105 and through passages 57A provided in the washers 57. The passage 105C is provided therein with the fixed orifice 61 and a filter 35. The fixed orifice 61 and the filter 35 are secured to a step portion 64 in the small-diameter portion 105 by a retainer 62 screwed into the distal end of the pilot member 105. The upstream side of the fixed orifice 61 of the passage 105C in the small-diameter portion 105A of the pilot member 105 communicates with the passages 39A in the main body 39 through a passage 52 provided in the side wall of the small-diameter portion 105A and through a passage 49A provided in the inner peripheral portions of the disk valve 30 and the washer 49.

The guide member 65 has a substantially circular cylindrical port member 67 press-fitted and secured in the port press-fit portion 65A. The port press-fit portion 65A has an annular retainer 66 attached to the distal end thereof. An O-ring 70 seals between the outer peripheral surface of the port member 67 and the inner peripheral surface of the pilot member 105, and a passage 68 in the port member 67 communicates with the passage 105C in the pilot member 105. The end portion of the port member 67 press-fitted into the guide member 65 has a port 36 formed by reducing the inner diameter of the passage 68. The port 36 opens into a valve chamber 73 formed in the guide member 65.

The guide member 65 has a plunger 78 inserted in the plunger-guide portion 65B thereof. The plunger 78 is slidably guided in the axial direction. The plunger 78 has a tapered valving element 38 provided at the distal end thereof. The valving element 38 is inserted into the valve chamber 73 in the guide member 65 to selectively open and close the port 36 by unseating from and seating on a seat portion 36A at the end of the port member 67. The plunger 78 has a large-diameter armature 79 provided at the proximal end thereof. The armature 79 is disposed outside the plunger-guide portion 65B. The plunger-guide portion 65B has a substantially bottomed circular cylindrical cover 80 of a non-magnetic material attached thereto to cover the armature 79. The cover 80 guides the armature 79 axially movably.

In the solenoid case 43, a coil 37 is disposed around the plunger-guide portion 65B projecting from the inward flange portion 104A of the insulating member 104 and around the cover 80. The coil 37 is axially adjacent to the insulating member 104 and secured by an annular closing member 81 of a magnetic material inserted in an overmold 107 sealing the opening portion of the solenoid case 43. A lead wire (not shown) connected to the coil 37 is extended to the outside through a notch in the closing member 81 and through the overmold 107. The plunger 78 is urged by the spring force of a return spring 84 provided between the plunger 78 and the port member 67 in a valve-opening direction in which the valving element 38 separates from the seat portion 36A to open the port 36. When the coil 37 is energized, the plunger 78 is thrusted to move against the spring force of the return spring 84 in a valve-closing direction in which valving element 38 seats on the seat portion 36A to close the port 36.

Next, the fail-safe valve 100 will be explained with reference to FIGS. 2 and 3.

The fail-safe body 103 is made of a non-magnetic material and liquid-tightly fitted between the solenoid case 43 and the large-diameter portion 105B of the pilot member 105 to form a chamber 108 at a side thereof closer to the insulating member 104. The fail-safe body 103 has a passage 109 provided in a portion closer to the outer periphery thereof. The passage 109 extends axially through the fail-safe body 103 to communicate between the chamber 25C in the casing 25 and the chamber 108. The fail-safe body 103 has annular seat portions 110 and 111 projecting from an end surface thereof closer to the chamber 108 at the inner and outer peripheral sides, respectively, of the passage 109. The chamber 108 is provided therein with a fail-safe valving element 112 which is an annular valving element made of a magnetic material. The fail-safe valving element 112 selectively unseats from and seats on the seat portions 110 and 111. The fail-safe valving element 112 serves as a movable element and is axially slidably guided at its inner peripheral portion by the large-diameter portion 105B of the pilot member 105, which serves as a guide portion. The outer peripheral portion of the fail-safe valving element 112 is disposed with an appropriate clearance between itself and the inner peripheral surface of the solenoid case 43. The fail-safe valving element 112 is axially movable between a fail-safe position (see illustration above the center line C in FIG. 2) where the fail-safe valving element 112 seats on the seat portions 110 and 111 and a normal position (see illustration below the center line C in FIG. 2) where the fail-safe valving element 112 abuts against the end of the anchor 106 serving as a magnetic attraction part. The fail-safe valving element 112 is urged toward the fail-safe position by the spring force of the fail-safe spring 101 through a spring retainer 113. The fail-safe valving element 112 is provided with a passage 114 axially extending through an inner periphery-side region of a seating portion seatable on the inner periphery-side seat portion 110. The seat portion 110 is provided with a notch that forms a fail-safe orifice 102 communicating between the passage 109 and the chamber 108 when the fail-safe valving element 112 seats on the seat portion 110. When in the fail-safe position, the fail-safe valving element 112 communicates between the chamber 108 and the passage 109 through the passage 114 and the fail-safe orifice 102; when in the normal position, the fail-safe valving element 112 communicates between the chamber 108 and the passage 109 through the passage 114.

The valve chamber 73 and the chamber 108 are communicated with each other through an axial groove 74 formed between the guide member 65 and the port member 67, a radial passage 75 formed in the retainer 66, an annular clearance 76 formed between the pilot member 105 and the port press-fit portion 65A of the guide member 65, and a groove 115 formed on the anchor 106 along the inner periphery and both ends thereof.

Among the members disposed around the coil 37, the armature 79, the guide member 65, the anchor 106, the fail-safe valving element 112, the solenoid case 43, and the closing member 81 are made of a magnetic material. The insulating member 104, the pilot member 105, and the fail-safe body 103, which are cross-hatched in FIG. 3, are made of a non-magnetic material. When the coil 37 is excited by energization, the above-described members made of a magnetic material form a magnetic path M as shown by the imaginary line in FIG. 3.

The following is an explanation of the operation of the damping force control type shock absorber 1 structured as stated above.

The damping force control type shock absorber 1 is installed between sprung and unsprung members of a suspension system of a vehicle. The damping force control type shock absorber 1 operates according to commands from an in-vehicle controller or the like. In a normal operating state (during normal operations), the coil 37 is energized to thrust the plunger 78 so as to seat the valving element 38 on the seat portion 36A, thus executing pressure control with the pilot valve 29.

During the extension stroke of the piston rod 6, the movement of the piston 5 in the cylinder 2 closes the check valve 13 of the piston 5. Before the disk valve 14 opens, the fluid in the cylinder upper chamber 2A, which serves as an upstream chamber, is pressurized to pass through the passage 22 and the annular passage 21 and to flow into the passage member 42 of the damping force generating mechanism 26 from the connecting opening 23 of the separator tube 20.

At this time, an amount of hydraulic oil corresponding to the amount of movement of the piston 5 flows into the cylinder lower chamber 2B from the reservoir 4 by opening the check valve 17 of the base valve 10. It should be noted that, when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive increase in pressure in the cylinder upper chamber 2A.

During the compression stroke of the piston rod 6, the movement of the piston 5 in the cylinder 2 opens the check valve 13 of the piston 5 and closes the check valve 17 for the passage 15 in the base valve 10. Before the disk valve 18 opens, the fluid in the cylinder lower chamber 2B flows into the cylinder upper chamber 2A, and an amount of fluid corresponding to the amount by which the piston rod 6 enters the cylinder 2 flows from the cylinder upper chamber 2A, which serves as an upstream chamber, into the reservoir 4 through a flow path similar to that during the above-described extension stroke. It should be noted that, when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive increase in pressure in the cylinder lower chamber 2B.

In the damping force generating mechanism 26, the hydraulic oil flowing in from the passage member 42 flows into the reservoir 4 mainly through the following three flow paths.

(1) Main Flow Path

The hydraulic oil flowing in from the passage member 42 passes through the passages 39A in the main body 39, opens the disk valve 30 of the main valve 27 to flow into the chamber 25C in the casing 25, and flows into the reservoir 4 through the passage groove 25B and the opening 24.

(2) Control Flow Path

The hydraulic oil flowing into the passage member 42 passes through the passages 39A in the main body 39 and flows into the pilot chamber 31 through the fixed orifice 32 of the disk valve 30. From the pilot chamber 31, the hydraulic oil further passes through the passages 53 in the control body 40, opens the disk valve 33 of the control valve 28 to flow into the chamber 25C in the casing 25, and passes through the passage groove 25B and the opening 24 to flow into the reservoir 4.

(3) Pilot Flow Path

The hydraulic oil flowing into the passage member 42 passes through the passages 39A in the main body 39 to flow into the pilot member 105 through the passage 49A provided at the inner peripheries of the disk valve 30 and the washer 49 and through the passage 52 in the side wall of the small-diameter portion 105A and flows into the passage 68 in the port member 67 through the filter 35 and the fixed orifice 61. The pressure of the hydraulic oil is introduced into the pilot chamber 34 through the passage 60 and the passages 57A. The hydraulic oil flowing into the passage 68 in the port member 67 passes through the port 36 and opens the valving element 38 of the pilot valve 29 to flow into the valve chamber 73. Further, the hydraulic oil passes through the axial groove 74, the radial passage 75, the clearance 76, and the groove 115 to flow into the chamber 108. The hydraulic oil flowing into the chamber 108 flows into the chamber 25C in the casing 25 through the fail-safe valve 100 and further passes through the passage groove 25B and the opening 24 to flow into the reservoir 4.

With the above-described configuration, the fail-safe valve 100 operates as follows. During normal operations in which pressure control is executed through the pilot valve 29 by energization of the coil 37, as shown in FIG. 3, a magnetic path M is formed by the armature 79, the guide member 65, the anchor 106, the fail-safe valving element 112, the solenoid case 43, and the closing member 81, which are made of a magnetic material. Consequently, the fail-safe valving element 112 is magnetically attracted to the anchor 106 to move to the normal position against the spring force of the fail-safe spring 101. In this state, the chamber 108 communicates with the chamber 25C in the casing 25 through the passage 114 and the passage 109. That is, the chamber 108 communicates with the reservoir 4.

Thus, when the system is in a normal state, during both the extension and compression strokes of the piston rod 6, damping force is generated by the main valve 27, control valve 28 and pilot valve 29 of the damping force generating mechanism 26. At this time, the disk valve 30 of the main valve 27 opens upon receiving the pressure in the passages 39A, and the pressure in the pilot chamber 31, which is provided at the back of the disk valve 30, acts on the disk valve 30 in the direction for closing the disk valve 30. That is, the disk valve 30 opens according to the differential pressure between the pressure in the passages 39A and that in the pilot chamber 31. Therefore, the valve-opening pressure of the disk valve 30 varies according to the pressure in the pilot chamber 31. That is, when the pressure in the pilot chamber 31 is low, the valve-opening pressure is low; when the pressure in the pilot chamber 31 is high, the valve-opening pressure is high.

The disk valve 33 of the control valve 28 opens upon receiving the pressure in the passages 53, and the pressure in the pilot chamber 34, which is provided at the back of the disk valve 33, acts on the disk valve 33 in the direction for closing the disk valve 33. That is, the disk valve 33 opens according to the differential pressure between the pressure in the passages 53 and that in the pilot chamber 34. Therefore, the valve-opening pressure of the disk valve 33 varies according to the pressure in the pilot chamber 34. That is, when the pressure in the pilot chamber 34 is low, the valve-opening pressure is low; when the pressure in the pilot chamber 34 is high, the valve-opening pressure is high.

When the piston speed is in a low speed region, the main valve 27 and the control valve 28 are closed. The hydraulic oil flows into the reservoir 4 mainly through the above-described pilot flow path (3). Accordingly, damping force is generated by the pilot valve 29. As the piston speed increases, the pressure on the upstream side of the pilot valve 29 increases. At this time, the pressures in the pilot chambers 31 and 34, which are upstream of the pilot valve 29, are controlled by the pilot valve 29. When the pilot valve 29 opens, the pressures in the pilot chambers 31 and 34 reduce. Consequently, first, the disk valve 33 of the control valve 28 opens, and the hydraulic oil flows into the reservoir 4 through the above-described control flow path (2) in addition to the pilot flow path (3). Accordingly, the increase in damping force due to the increase in piston speed is suppressed.

When the disk valve 33 of the control valve 28 opens, the pressure in the pilot chamber 31 reduces. As a result of the reduction in pressure in the pilot chamber 31, the disk valve 30 of the main valve 27 opens. Consequently, the hydraulic oil flows into the reservoir 4 through the above-described main flow path (1) in addition to the pilot flow path (3) and the control flow path (2). Accordingly, the increase in damping force due to the increase in piston speed is suppressed.

Thus, the increase in damping force due to the increase in piston speed is suppressed in two stages, thereby allowing appropriate damping force characteristics to be obtained. In addition, it is possible to control the pressure in the pilot chamber 34 of the control valve 28, i.e. the valve-opening pressure of the disk valve 33, by adjusting the control pressure of the pilot valve 29 through energization of the coil 37. Further, it is possible to control the pressure in the pilot chamber 31 of the main valve 27, i.e. the valve-opening pressure of the disk valve 30, by controlling the valve-opening pressure of the disk valve 33.

Thus, in a piston speed region where the main valve 27 is closed, a sufficient flow rate of hydraulic oil can be obtained because the disk valve 33 of the control valve 28 opens in addition to the pilot valve 29. Accordingly, the flow rate through the pilot valve 29 (i.e. the flow path area of the port 36) can be reduced, and it becomes possible to reduce the size of the pilot valve 29 (solenoid valve) and to save power consumption in the coil 37. In addition, because the damping force can be adjusted in two stages by the main valve 27 and the control valve 28, it is possible to increase the degree of freedom for adjusting damping force characteristics and hence possible to obtain appropriate damping force characteristics.

If it should become impossible to energize the coil 37 owing to a failure, disconnection, etc. in the controller (i.e. in the event of a failure), the fail-safe valve 100 operates as follows. The fail-safe valving element 112 is released from the magnetic hold by the anchor 106 as a result of the disappearance of the magnetic field of the coil 37 and moved to the fail-safe position shown above the center line C in FIG. 2 by the spring force of the fail-safe spring 101. In this state, the chamber 108 communicates with the chamber 25C in the casing 25, i.e. the reservoir 4, through the fail-safe orifice 102 and the passage 109. Consequently, damping force can be generated by the fail-safe valving element 112 in place of the pilot valve 29, which has become inoperable, and it is possible to control the valve-opening pressures of the control valve 28 and the main valve 27 by adjusting the pressures in the pilot chamber 34 of the control valve 28 and the pilot chamber 31 of the main valve 27. Thus, an appropriate damping force can be obtained even when there is a failure.

In the fail-safe valve 100, the fail-safe valving element 112 is slidably guided at its inner peripheral portion by the large-diameter portion 105B of the pilot member 105, which is a non-magnetic material. Accordingly, there occurs no lateral force which would otherwise be generated by a magnetic force, and the fail-safe valving element 112 can move smoothly. On the other hand, a clearance is provided between the outer peripheral portion of the fail-safe valving element 112 and the inner peripheral surface of the solenoid case 43, which is a magnetic material. Therefore, even if a lateral force is generated by a magnetic force, there is no hindrance to the smooth movement of the fail-safe valving element 112.

Figure 3:
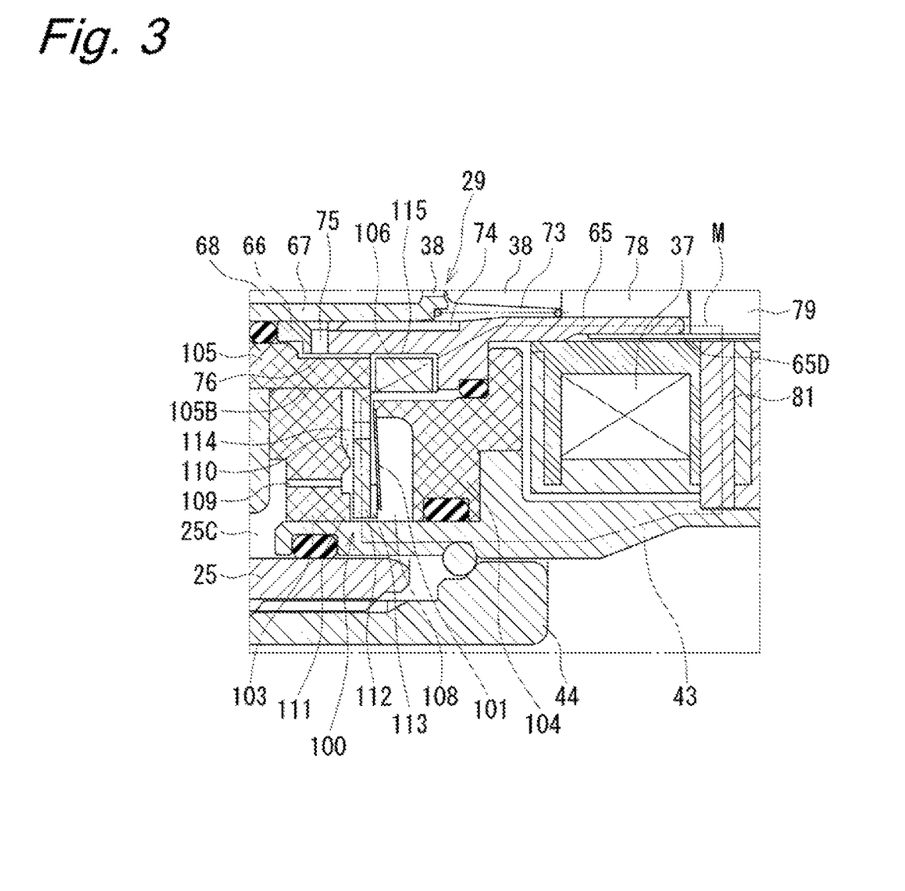
FIG. 3 is an enlarged vertical sectional view of a fail-safe valve of the damping force generating mechanism shown in FIG. 2.

As shown in FIG. 3, during normal operations, the fail-safe valving element 112 is magnetically attracted to the anchor 106, and hence the magnetic gap therebetween is zero. Therefore, the magnetic attraction force reaches a maximum, and the fail-safe valving element 112 is stably self-held in the normal position. In the event of a failure, the pressures of hydraulic oil acting on the opposite ends of the fail-safe valving element 112 become equal to each other owing to the presence of the passage 114; however, the pressure-receiving area of the fail-safe valving element 112 becomes larger at the side thereof closer to the chamber 108 because the fail-safe valving element 112 seats on the seat portions 110 and 111. Therefore, the fail-safe valving element 112 can be stably held in the fail-safe position by the pressure of hydraulic oil.

Next, a second embodiment of the present invention will be explained with reference to FIG. 4. It should be noted that, in the following explanation, portions similar to those of the foregoing first embodiment are denoted by the same reference signs as in the first embodiment, and that only the portions in which the second embodiment differs from the first embodiment will be illustrated and explained in detail.

Figure 4:
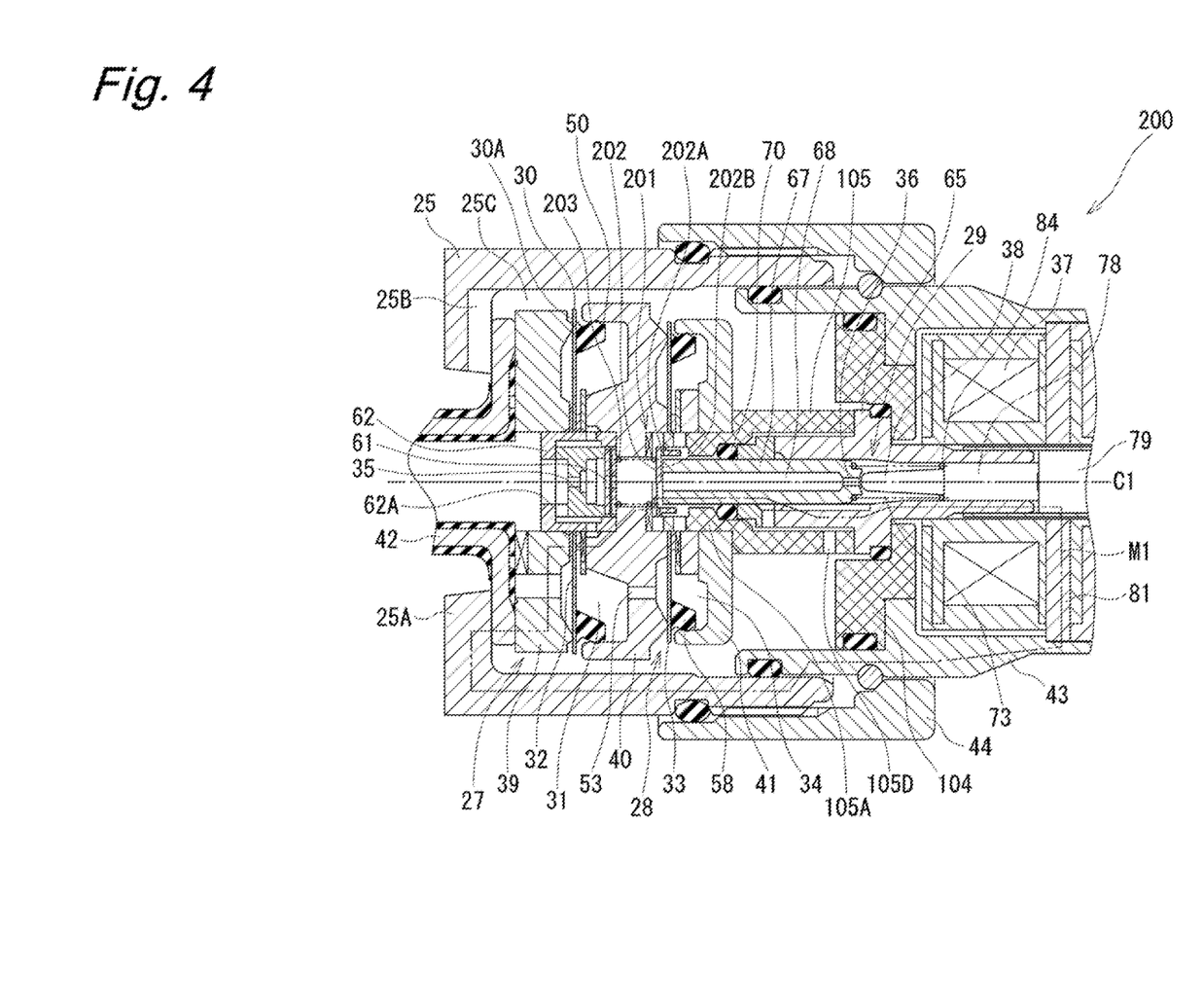
FIG. 4 is an enlarged vertical sectional view of a damping force generating mechanism as an important part of a damping force control type shock absorber according to a second embodiment of the present invention.

As shown in FIG. 4, a damping force generating mechanism 200 according to this embodiment has a fail-safe valve 201 provided upstream of the pilot valve 29. The fixed orifice 61 communicates with the passage member 42 through a passage 62A provided in the retainer 62, thereby allowing the hydraulic oil to be introduced into the pilot chamber 34 of the control valve 28 and the pilot valve 29 from the passage member 42 through the fixed orifice 61. The valve chamber 73 of the pilot valve 29 communicates with the chamber 25C in the casing 25 through a passage 105D provided in the side wall of the large-diameter portion 105B of the pilot member 105.

The fail-safe valve 201 has a substantially bottomed circular cylindrical fail-safe valving element 202 disposed between the distal end of the port member 67 and the end of the control body 40 to selectively open and close the passage 68 by unseating from and seating on the distal end of the port member 67. The fail-safe valve 201 further has a fail-safe spring 203 which is a compression coil spring interposed between the fail-safe valving element 202 and the filter 35, which is secured in the pilot member 105. The fail-safe valving element 202 is disposed between the distal end of the port member 67, which serves as a seat part, and the magnetic attraction part, i.e. the end of the control body 40, which serves as an anchor. The fail-safe valving element 202 is axially movable by being slidably guided at its outer peripheral portion by the small-diameter portion 105A of the pilot member 105 (non-magnetic material). The fail-safe valving element 202 has a passage 202A provided in the side wall thereof and further has an orifice groove 202B provided in a bottom portion thereof at which the fail-safe valving element 202 selectively unseats from and seats on the distal end of the port member 67. With this structure, when the fail-safe valving element 202 is in a normal position where the fail-safe valving element 202 unseats from the distal end of the port member 67 (see illustration below a center line C1 in FIG. 4), the fail-safe valving element 202 opens the flow path to the passage 68 in the port member 67 through the passage 202A. When the fail-safe valving element 202 is in a fail-safe position where the fail-safe valving element 202 seats on the distal end of the port member 67 (see illustration above the center line C1 in FIG. 4), the orifice groove 202B restricts the flow path to the passage 68 in the port member 67. The fail-safe spring 203 urges the fail-safe valving element 202 toward the fail-safe position by the spring force thereof.

Among the members disposed around the coil 37, the armature 79, the guide member 65, the port member 67, the fail-safe valving element 202, the control body 40, the main body 39, the casing 25, the solenoid case 43, and the closing member 81 are made of a magnetic material. The insulating member 104 and the pilot member 105, which are cross-hatched in FIG. 4, are made of a non-magnetic material. When the coil 37 is excited by energization, the above-described members made of a magnetic material form a magnetic path M1 as shown by the imaginary line in FIG. 4.

With the above-described structure, damping force can be generated and adjusted by energization of the coil 37 in the same way as in the foregoing first embodiment. In this regard, during normal operations in which pressure control can be executed through the pilot valve 29 by energization of the coil 37, when the coil 37 is energized, a magnetic path M1 is formed in the fail-safe valve 201, as shown below the center line C1 in FIG. 4, by the armature 79, the guide member 65, the port member 67, the fail-safe valving element 202, the control body 40, the main body 39, the casing 25, the solenoid case 43, and the closing member 81, which are made of a magnetic material, and the fail-safe valving element 202 is magnetically attracted to the control body 40 to move to the normal position against the spring force of the fail-safe spring 203. In this state, the flow path to the passage 68 in the port member 67 opens, and damping force is generated by the pilot valve 29.

If it should become impossible to energize the coil 37 owing to a failure, disconnection, etc. in the controller (i.e. in the event of a failure), the fail-safe valve 201 operates as follows. The fail-safe valving element 202 is released from the magnetic hold by the control body 40 as a result of the disappearance of the magnetic field of the coil 37 and moved to the fail-safe position shown above the center line C1 in FIG. 4 by the spring force of the fail-safe spring 203. In this state, the orifice groove 202B of the fail-safe valving element 202 restricts the flow path to the passage 68 in the port member 67. Consequently, damping force can be generated by the orifice groove 202B of the fail-safe valving element 202 in place of the pilot valve 29, which has become inoperable, and it is possible to control the valve-opening pressures of the control valve 28 and the main valve 27 by adjusting the pressures in the pilot chamber 34 of the control valve 28 and the pilot chamber 31 of the main valve 27. Thus, an appropriate damping force can be obtained even when there is a failure.

In the fail-safe valve 201, the fail-safe valving element 202 is slidably guided by the inner peripheral portion of the small-diameter portion 105A of the pilot member 105, which is a non-magnetic material. Accordingly, no lateral force due to a magnetic force acts on the fail-safe valving element 202, and the fail-safe valving element 202 can move smoothly. On the other hand, a clearance is provided between the inner peripheral portion of the fail-safe valving element 202 and the outer peripheral surface of the port member 67, which is a magnetic material. Therefore, even if a lateral force is generated by a magnetic force, the smooth movement of the fail-safe valving element 202 is hardly hindered.

Although in the above-described first and second embodiments the fail-safe valve is configured to generate a damping force by restriction of the flow path through an orifice in the event of a failure, it is also possible to use other types of valve mechanisms, e.g. a disk valve, to generate a damping force. For example, the degree of opening of the fail-safe valving element may be adjusted by using the spring force of the fail-safe spring. In this case, the magnetic attraction force of the solenoid coil needs to be considerably large because the fail-safe valving element needs to be moved to the normal position against the spring force of the fail-safe spring during normal operations.

In the above-described first and second embodiments, the pilot valve may be formed into a flow control valve of spool type or the like to adjust the flow rate of hydraulic oil flowing into the reservoir to thereby generate a damping force and also to control the pressures in the pilot chambers of the main and control valves.

Although in the above-described first and second embodiments the damping force generating mechanism is provided between the cylinder upper chamber and the reservoir by way of example, the present invention is not limited thereto. The damping force generating mechanism may be disposed in any position, provided that damping force can be generated by controlling the flow of hydraulic fluid by sliding movement of the piston in the cylinder. It is also possible to dispose damping force generating mechanisms at different positions for the extension and compression strokes.

Further, the present invention may be applied to a shock absorber in which a damping force generating mechanism is provided in the piston assembly, as disclosed, for example, in Japanese Patent Laid-Open Publication No. 2008-267489. In this case, a mechanism corresponding to the damping force generating mechanism may be provided for each of the flow of hydraulic oil from the cylinder upper chamber to the cylinder lower chamber and the flow of hydraulic oil from the cylinder lower chamber to the cylinder upper chamber. In such a case, the present invention is also applicable to a mono-tube shock absorber.

Although in the foregoing embodiments the present invention has been explained with regard to a shock absorber having a fail-safe valve incorporated in a pilot-type damping force generating mechanism, the present invention is not limited thereto but may be similarly applied to shock absorbers having a fail-safe valve incorporated in other types of damping force generating mechanisms.

Next, a third embodiment of the present invention will be explained with reference to FIGS. 5 and 6. It should be noted that, in the following explanation, portions similar to those in the above-described first embodiment are denoted by the same reference signs as in the first embodiment, and that only the portions in which the third embodiment differs from the first embodiment will be illustrated and explained in detail.

Figure 5:
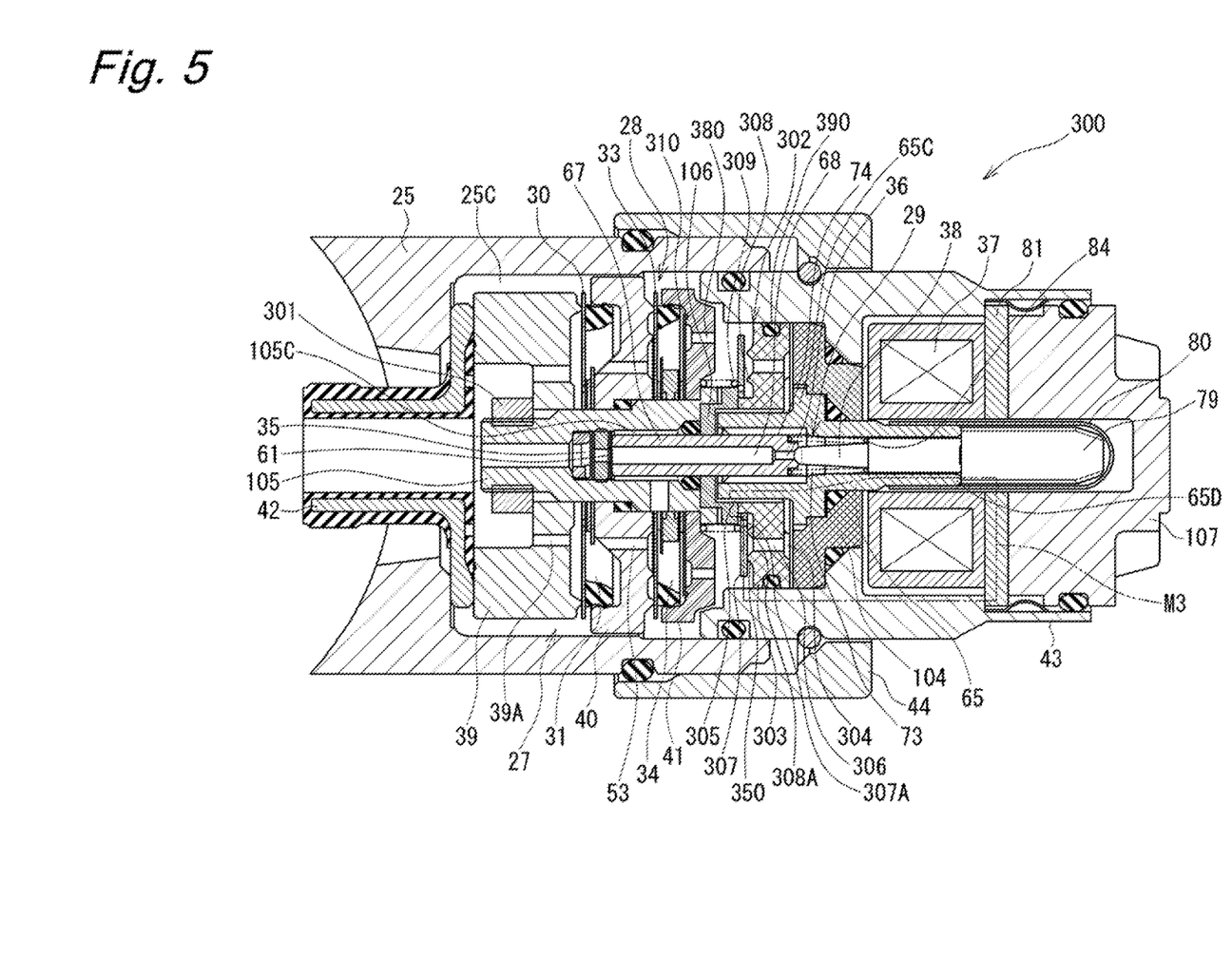
FIG. 5 is an enlarged vertical sectional view of a damping force generating mechanism as an important part of a damping force control type shock absorber according to a third embodiment of the present invention.
Figure 6:
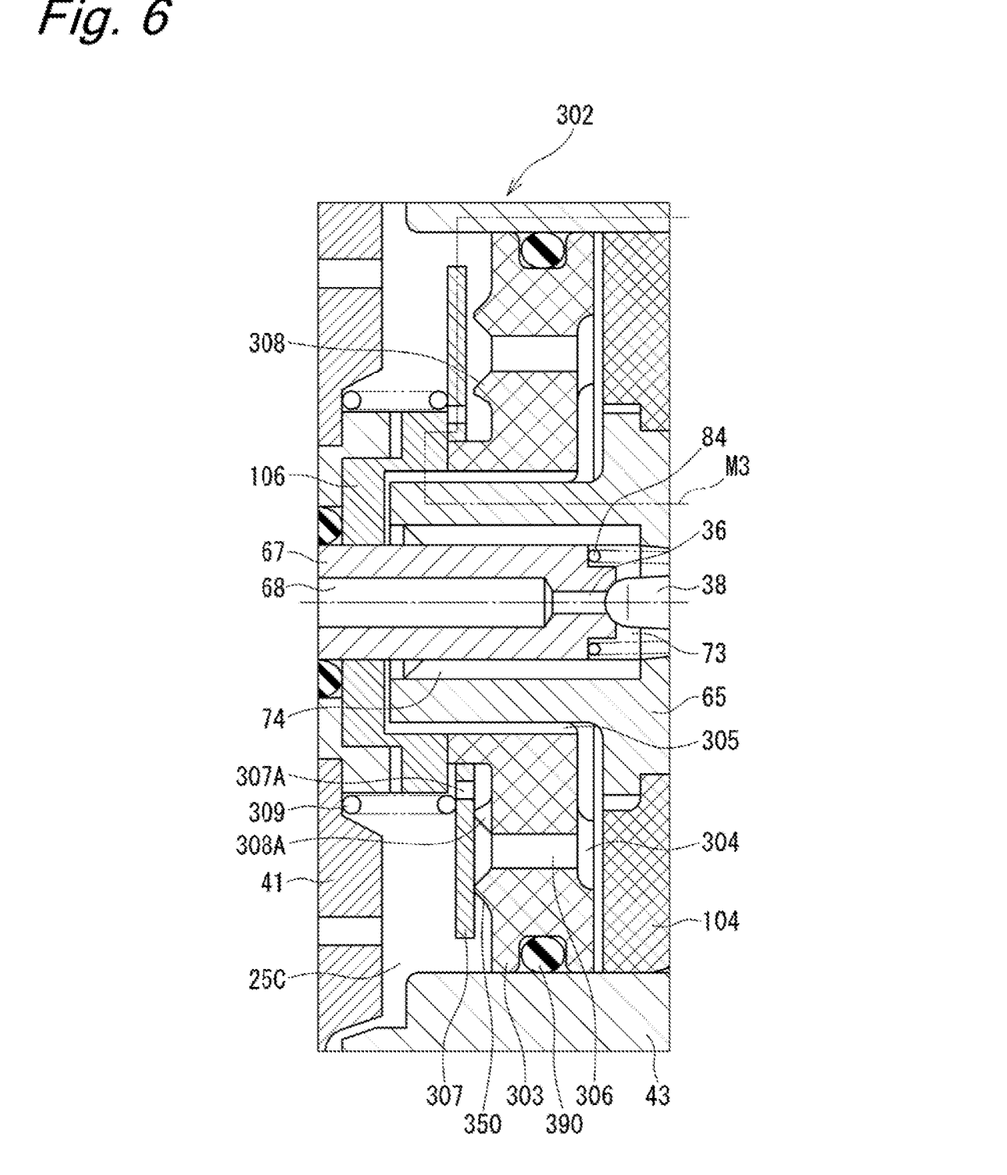
FIG. 6 is an enlarged vertical sectional view of a fail-safe valve of the damping force generating mechanism shown in FIG. 5.

As shown in FIGS. 5 and 6, in a damping force generating mechanism 300 of a shock absorber according to this embodiment, the distal end of the pilot member 105 is open, and the passage 105C in the pilot member 105 communicates with the passage member 42 through the fixed orifice 61 and the filter 35. The main body 39, the control body 40, and the pilot chamber member 41 are secured to the pilot member 105 with a nut 301 thread-engaged with an outer peripheral portion at the distal end of the pilot member 105. A stepped circular cylindrical anchor 106, which is a magnetic material, is provided between the end of the large-diameter portion 105B of the pilot member 105 and the end of the guide member 65. The pilot chamber 34 is given volumetric elasticity by a pliable disk member 310 to stabilize the valve opening characteristics of the control valve 28. It should be noted that air undesirably entering the pilot chamber 34 through between the disk member 310 and the pilot chamber member 41 can be made to flow out into the chamber 25C in the casing 25 through a plurality of communicating passages 380 formed in the pilot chamber member 41.

Further, in the damping force generating mechanism 300, a fail-safe valve 302 has a fail-safe body 303 abutting at one end thereof against the large-diameter portion 65C of the guide member 65 to form a chamber 304 between the fail-safe body 303 and the insulating member 104. The chamber 304 communicates with the valve chamber 73 through a clearance 305 between the inner peripheral portion of the fail-safe body 303 and the anchor 106, on the one hand, and, on the other, the guide member 65 and through the axial groove 74, which is formed between the guide member 65 and the port member 67. The fail-safe body 303 is provided with a passage 306 communicating between the chamber 304 and the chamber 25C in the casing 25. The other end of the fail-safe body 303 is formed with an inner periphery-side seat portion 308 and an outer periphery-side seat portion 350 with respect to which a fail-safe valving element 307, which is a valving element of the fail-safe valve 302, selectively unseats and seats to open and close the passage 306.

The fail-safe valving element 307 is an annular valving element made of a magnetic material and movable between a fail-safe position (see illustration below the center line in FIG. 6) where the fail-safe valving element 307 seats on the seat portion 308 of the fail-safe body 303 and a normal position (see illustration above the center line in FIG. 6) where the fail-safe valving element 307 separates from the seat portion 308 and abuts against the end of the large-diameter portion of the anchor 106. The fail-safe valving element 307 is urged toward the fail-safe position to close the passage 306 by the spring force of a fail-safe spring 309 which is a compression coil spring interposed between the fail-safe valving element 307 and the pilot chamber member 41. In the fail-safe position, the fail-safe valving element 307 closes the passage 306 and allows the hydraulic oil to flow from the passage 306 to the chamber 25C in the casing 25 through a notch 308A formed on the inner periphery-side seat portion 308 and through an orifice 307A extending through an inner peripheral portion of the fail-safe valving element 307.

Among the members disposed around the coil 37, the armature 79, the guide member 65, the anchor 106, the fail-safe valving element 307, the solenoid case 43, and the closing member 81 are made of a magnetic material. The insulating member 104, the fail-safe body 303, and the fail-safe spring 309, which are cross-hatched in FIG. 5, are made of a non-magnetic material. It should be noted that, by forming the fail-safe spring 309 from a non-magnetic material as stated above, it is possible to prevent a magnetic flux from flowing through the fail-safe spring 309 before the fail-safe valving element 307 is magnetically attracted to the anchor 106. With the above-described structure, when the coil 37 is excited by energization, the above-described members made of a magnetic material, i.e. the armature 79, the guide member 65, the anchor 106, the fail-safe valving element 307, the solenoid case 43, and the closing member 81, form a magnetic path M3.

The fail-safe body 303 is provided with an O-ring 390 as a seal member between the fail-safe body 303 and the solenoid case 43. This structure prevents the hydraulic fluid from flowing out into the chamber 25C in the casing 25 through a gap between the fail-safe body 303 and the solenoid case 43 without passing through the fail-safe valving element 307 in the event of a failure. Provision of the O-ring 390 in the structure of this embodiment, in which the pilot flow rate is reduced by the small-diameter port 36, makes it possible to prevent leakage of hydraulic fluid and to maintain the pressure in each of the pilot chambers 31 and 34 at a desired set pressure.

With the above-described structure, damping force can be generated and adjusted by energization of the coil 37 in the same way as in the foregoing first embodiment. In this regard, during normal operations in which pressure control can be executed through the pilot valve 29 by energization of the coil 37, when the coil 37 is energized, a magnetic path M3 is formed in the fail-safe valve 302 by the armature 79, the guide member 65, the anchor 106, the fail-safe valving element 307, the solenoid case 43, and the closing member 81, which are made of a magnetic material. Consequently, the fail-safe valving element 307 is magnetically attracted to the anchor 106 to move in the same direction as the valving element 38 of the pilot valve 29 against the spring force of the fail-safe spring 309 and thus disposed in the normal position (see illustration above the center line in FIG. 6). In this state, the flow path from the passage 306 in the fail-safe body 303 to the chamber 25C in the casing 25 opens, and damping force is generated by the pilot valve 29.

If it should become impossible to energize the coil 37 owing to a failure, disconnection, etc. in the controller (i.e. in the event of a failure), the fail-safe valve 302 operates as follows. The fail-safe valving element 307 is released from the magnetic hold by the anchor 106 as a result of the disappearance of the magnetic field of the coil 37 and moved to the fail-safe position (see illustration below the center line in FIG. 6), where the fail-safe valving element 307 seats on the inner periphery-side seat portion 308 and outer periphery-side seat portion 350, by the spring force of the fail-safe spring 309. In this state, the fail-safe valving element 307 closes the passage 306 and allows the hydraulic oil to flow from the passage 306 to the chamber 25C in the casing 25 through the notch 308A on the inner periphery-side seat portion 308 and through the orifice 307A in the fail-safe valving element 307. Consequently, damping force can be generated by the fail-safe valve 302 in place of the pilot valve 29, which has become inoperable, and it is possible to control the valve-opening pressures of the control valve 28 and the main valve 27 by adjusting the pressures in the pilot chamber 34 of the control valve 28 and the pilot chamber 31 of the main valve 27. Thus, an appropriate damping force can be obtained even when there is a failure.

In the fail-safe valve 302, the fail-safe valving element 307 is slidably guided at its inner peripheral portion by the fail-safe body 303, which is a non-magnetic material. Accordingly, there occurs no lateral force which would otherwise be generated by a magnetic force, and the fail-safe valving element 307 can move smoothly. On the other hand, a clearance is provided between the outer peripheral portion of the fail-safe valving element 307 and the inner peripheral surface of the solenoid case 43, which is a magnetic material. Therefore, even if a lateral force is generated by a magnetic force, there is no hindrance to the smooth movement of the fail-safe valving element 307. Further, during normal operations, the fail-safe valving element 307 is magnetically attracted to the anchor 106, and hence the magnetic gap therebetween is zero. Therefore, the magnetic attraction force reaches a maximum, and the fail-safe valving element 307 is stably self-held in the normal position.

Next, a fourth embodiment of the present invention will be explained with reference to FIGS. 7 and 8.

It should be noted that, in the following explanation, portions similar to those in the above-described third embodiment are denoted by the same reference signs as in the third embodiment, and that only the portions in which the fourth embodiment differs from the third embodiment will be illustrated and explained in detail.

Figure 7:
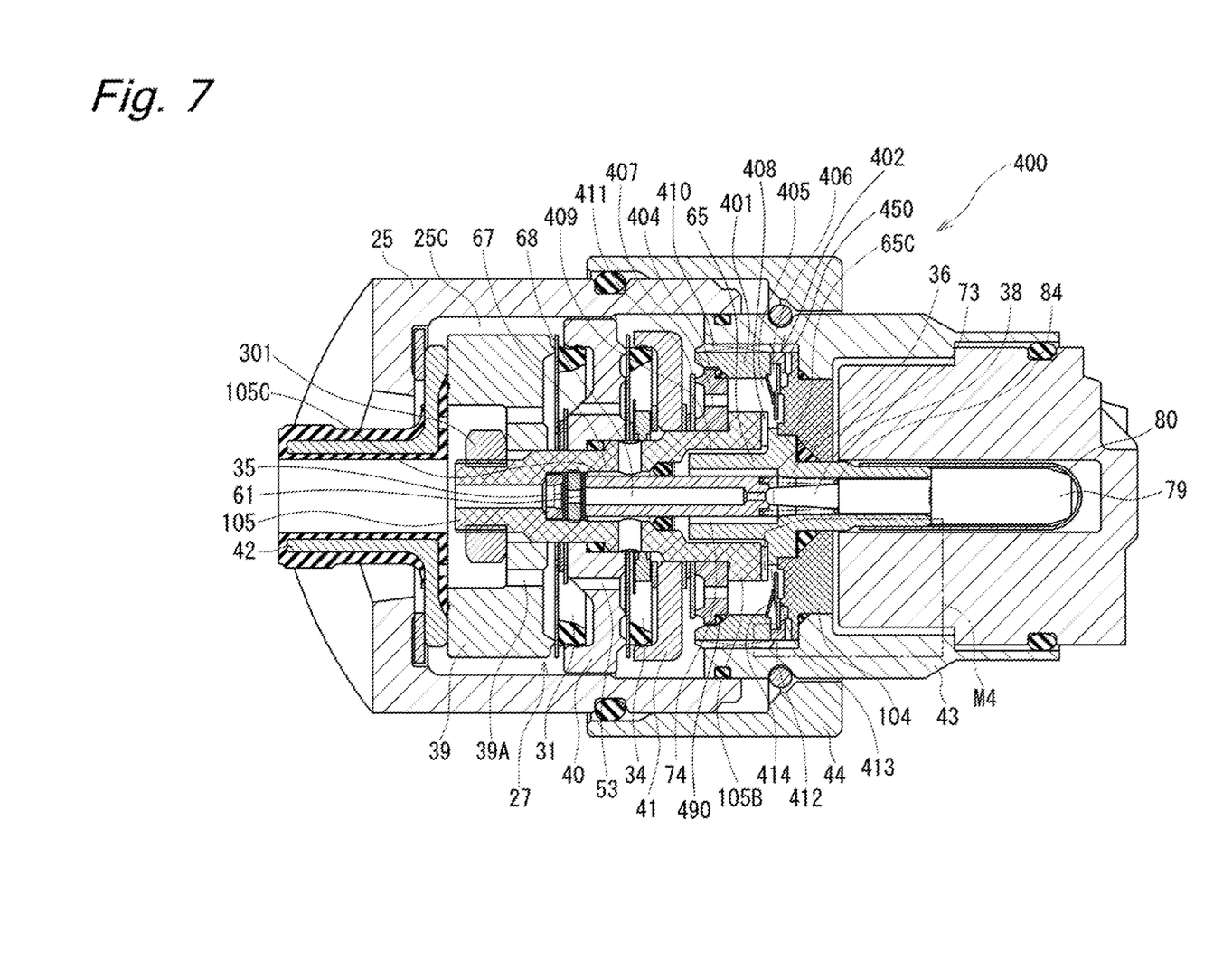
FIG. 7 is an enlarged vertical sectional view of a damping force generating mechanism as an important part of a damping force control type shock absorber according to a fourth embodiment of the present invention.
Figure 8:
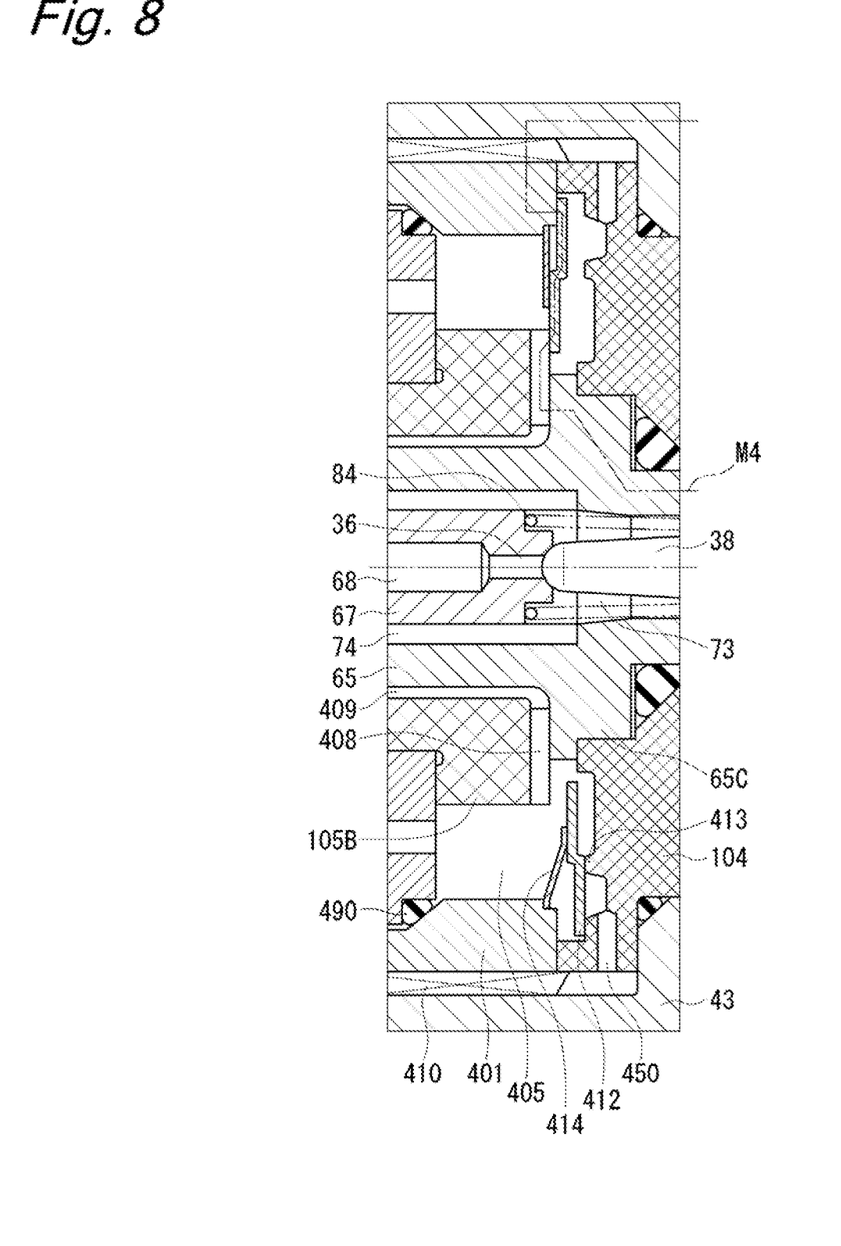
FIG. 8 is an enlarged vertical sectional view of a fail-safe valve of the damping force generating mechanism shown in FIG. 7.

As shown in FIGS. 7 and 8, in a damping force generating mechanism 400 of a shock absorber according to this embodiment, the solenoid case 43 has a circular cylindrical retaining member 401 fitted to the inner peripheral portion thereof. One end of the retaining member 401 is in abutting contact with the insulating member 104. The end of the large-diameter portion 105B of the pilot member 105 is in abutting contact with the large-diameter portion 65C of the guide member 65. An annular passage 405 is formed between the retaining member 401 and the large-diameter portion 105B of the pilot member 105. A valve chamber 406 is formed between the retaining member 401 and the pilot member 105, on the one hand, and, on the other, the insulating member 104. A fail-safe body 404 is fitted between the inner peripheral portion of the retaining member 401 and the outer peripheral portion of the pilot member 105. The fail-safe body 404 is secured to the pilot member 105 with the nut 301, together with the main body 39, the control body 40, and the pilot chamber member 41. The fail-safe body 404 has a passage 407 axially extending therethrough to communicate with the passage 405.

The valve chamber 406 communicates with the valve chamber 73 through a groove 408 formed on the large-diameter portion 65C of the guide member 65, which abuts against the end of the large-diameter portion 105B of the pilot member 105, and further through a clearance 409 between the inner peripheral portion of the large-diameter portion 105B of the pilot member 105 and the outer peripheral portion of the guide member 65 and through an axial groove 74 formed between the guide member 65 and the port member 67. The valve chamber 406 further communicates with the chamber 25C in the casing 25 through the passage 405 and the passage 407 in the fail-safe body 404. Further, the valve chamber 406 communicates with the chamber 25C in the casing 25 through a radial passage 450 formed in the outer peripheral portion of the insulating member 104 and through an axial groove 410 formed on the outer peripheral portion of the retaining member 401, which is fitted to the solenoid case 43.

The fail-safe body 404 has a fail-safe valving element 411 provided on one end thereof. The fail-safe valving element 411 comprises an orifice and a disk valve to generate a damping force by controlling the flow of hydraulic oil from the passage 407 in the fail-safe body 404 to the chamber 25C in the casing 25. The valve chamber 406 is provided therein with a fail-safe switching valving element 412 made of an annular magnetic material and serving as a valving element of a fail-safe valve 402. The insulating member 104 has an annular seat portion 413 projecting from an end surface thereof to face an outer peripheral portion of the fail-safe switching valving element 412 so that the fail-safe switching valving element 412 selectively unseats from and seats on the seat portion 413. The fail-safe switching valving element 412 selectively opens and closes the flow path between the valve chamber 406 and the radial passage 450 by unseating from and seating on the seat portion 413. The fail-safe switching valving element 412 is axially guided at its outer peripheral portion by an inner peripheral portion of the insulating member 104 so as to be movable between a normal position (see illustration above the center line in FIG. 8) where the fail-safe switching valving element 412 abuts against the end surface of the retaining member 401 and a fail-safe position (see illustration below the center line in FIG. 8) where the fail-safe switching valving element 412 seats on the seat portion 413 of the insulating member 104. The fail-safe switching valving element 412 abuts against a valve spring (leaf spring) 414 supported at an outer peripheral portion thereof by a stepped portion at the end of the retaining member 401 and radiating radially inward. The fail-safe switching valving element 412 is urged toward the fail-safe position by the spring force of the valve spring 414.

Among the members disposed around the coil 37, the armature 79, the guide member 65, the fail-safe switching valving element 412, the retaining member 401, the solenoid case 43, and the closing member 81 (not shown in FIG. 8) are made of a magnetic material. The insulating member 104 and the pilot member 105, which are cross-hatched in FIGS. 7 and 8, are made of a non-magnetic material. Thus, when the coil 37 is excited by energization, the above-described members made of a magnetic material, i.e. the armature 79, the guide member 65, the fail-safe switching valving element 412, the retaining member 401, the solenoid case 43, and the closing member 81 (not shown in FIG. 8), form a magnetic path M4.

The fail-safe body 404 is provided with an O-ring 490 as a seal member between the fail-safe body 404 and the retaining member 401. This structure prevents the hydraulic fluid from flowing out into the chamber 25C in the casing 25 through a gap between the fail-safe body 404 and the retaining member 401 without passing through the fail-safe valving element 411 in the event of a failure. Provision of the O-ring 490 in the structure of this embodiment, in which the pilot flow rate is reduced by the small-diameter port 36, makes it possible to prevent leakage of hydraulic fluid and to maintain the pressure in each of the pilot chambers 31 and 34 at a desired set pressure.

With the above-described structure, damping force can be generated and adjusted by energization of the coil 37 in the same way as in the foregoing third embodiment. In this regard, during normal operations in which pressure control can be executed through the pilot valve 29 by energization of the coil 37, when the coil 37 is energized, a magnetic path M4 is formed in the fail-safe valve 402 by the armature 79, the guide member 65, the fail-safe switching valving element 412, the retaining member 401, the solenoid case 43, and the closing member 81 (not shown in FIG. 8), which are made of a magnetic material, and the fail-safe switching valving element 412 is magnetically attracted to the retaining member 401 to move in the same direction as the valving element 38 of the pilot valve 29 and disposed in the normal position (see illustration above the center line in FIG. 8). In this state, the fail-safe switching valving element 412 separates from the seat portion 413 to open the flow path from the valve chamber 406 to the radial passage 450. Consequently, the flow path from the valve chamber 73 at the downstream side of the pilot valve 29 to the chamber 25C in the casing 25 opens, and damping force is generated by the pilot valve 29.

If it should become impossible to energize the coil 37 owing to a failure, disconnection, etc. in the controller (i.e. in the event of a failure), the fail-safe valve 402 operates as follows. The fail-safe switching valving element 412 is released from the magnetic hold by the retaining member 401 as a result of the disappearance of the magnetic field of the coil 37 and moved by the spring force of the fail-safe spring 414 to the fail-safe position (see illustration below the center line in FIG. 8), where the fail-safe switching valving element 412 seats on the seat portion 413 to close the radial passage 450. Consequently, the hydraulic oil at the downstream side of the pilot valve 29 flows from the valve chamber 406 through the passages 405 and 407 into the chamber 25C in the casing 25 via the fail-safe valving element 411. Accordingly, damping force can be generated by the fail-safe valving element 411 in place of the pilot valve 29, which has become inoperable, and it is possible to control the valve-opening pressures of the control valve 28 and the main valve 27 by adjusting the pressures in the pilot chamber 34 of the control valve 23 and the pilot chamber 31 of the main valve 27. Thus, an appropriate damping force can be obtained even when there is a failure.

In the fail-safe valve 402, the fail-safe switching valving element 412 is slidably guided at its outer peripheral portion by the insulating member 104, which is a non-magnetic material. Accordingly, there occurs no lateral force which would otherwise be generated by a magnetic force, and the fail-safe switching valving element 412 can move smoothly. On the other hand, a clearance is provided between the inner peripheral portion of the fail-safe switching valving element 412 and the guide member 65, which is a magnetic material. Therefore, even if a lateral force is generated by a magnetic force, there is no hindrance to the smooth movement of the fail-safe switching valving element 412. During normal operations, the fail-safe switching valving element 412 is magnetically attracted to the retaining member 401 and the groove 408 of the guide member 65, and hence the magnetic gap therebetween is zero. Therefore, the magnetic attraction force reaches a maximum, and the fail-safe switching valving element 412 is stably self-held in the normal position.

It should be noted that, in any of the foregoing embodiments, the fail-safe valving element is magnetically attracted to the anchor, and the armature is magnetically attracted to the guide member. In other words, the fail-safe valving element and the armature, which are movable elements, are configured to be magnetically attracted to different stators (the anchor and the guide member), respectively, which form a magnetic path. With this structure, a magnetic attraction surface, which requires accuracy, only needs to be formed on one surface of one member. Therefore, the structure is superior in productivity to a structure in which two movable elements are magnetically attracted to one stator.

It should be noted that the third embodiment shows a structure in which air undesirably entering the pilot chamber 34 through between the disk member 310 and the pilot chamber member 41 is made to flow out into the chamber 25C in the casing 25 through a plurality of communicating passages 380 formed in the pilot chamber member 41. The pilot chamber member 41 in any of the other embodiments may adopt the same structure as in the third embodiment. By so doing, air undesirably entering the pilot chamber 34 can be made to flow out into the chamber 25C in the casing 25. Further, in any of the foregoing embodiments, if the pilot chamber member 41, which forms the pilot chamber 34, is manufactured by sintering as a sintered component having micropores, only air undesirably entering the pilot chamber can be discharged through the micropores in the sintered component without leaking hydraulic fluid. Forming the pilot chamber member 41 by sintering makes it possible to reduce manufacturing cost as compared to a manufacturing process in which the pilot chamber member 41 is formed by cutting or forging.

REFERENCE SIGNS LIST

1 . . . damping force control type shock absorber, 2 . . . cylinder, 5 . . . piston, 6 . . . piston rod, 26 . . . damping force generating mechanism, 29 . . . pilot valve (solenoid valve), 37 . . . coil, 100 . . . fail-safe valve, 101 . . . fail-safe spring (urging member), 105B . . . large-diameter portion (guide part), 106 . . . anchor (magnetic attraction part), 112 . . . fail-safe valving element (valving element), 110, 111 . . . seat portion.

The invention claimed is:

1. A damping force control type shock absorber comprising a cylinder having a hydraulic fluid sealed therein, a piston slidably fitted in the cylinder, a piston rod connected to the piston and extended to an outside of the cylinder, and a damping force generating mechanism generating a damping force by controlling a flow of hydraulic fluid induced by sliding movement of the piston in the cylinder;

the damping force generating mechanism including a normally-open solenoid valve operated by energization of a coil to control the flow of hydraulic fluid, and a fail-safe valve provided upstream or downstream of the solenoid valve, the fail-safe valve being movable independently of the solenoid valve;

the fail-safe valve having a valving element movable between a normal position where the valving element opens a flow path of the hydraulic fluid and a fail-safe position where the valving element controls the flow of hydraulic fluid to generate a damping force, the fail-safe valve further having a seat part with respect to which the valving element selectively seats and unseats, a guide part movably guiding the valving element, an urging member urging the valving element toward the fail-safe position, and a magnetic attraction part magnetically attracting the valving element through a magnetic field of the coil to move the valving element to the normal position;

the seat part and the guide part being made of a non-magnetic material not forming a magnetic path through the magnetic field of the coil, and the valving element and the magnetic attraction part being made of a magnetic material forming a magnetic path through the magnetic field of the coil, the entire portion of the seat part and the entire portion of the guide part being disposed outside an area defined by the magnetic path through the magnetic field of the coil.

2. The damping force control type shock absorber of claim 1, wherein the solenoid valve has a valving element moved by energization of the coil in a same direction as the valving element of the fail-safe valve so as to be disposed in the normal position.

3. The damping force control type shock absorber of claim 1, wherein the solenoid valve and the fail-safe valve are driven by being magnetically attracted to different members, respectively.

4. The damping force control type shock absorber of claim 2, wherein the solenoid valve and the fail-safe valve are driven by being magnetically attracted to different members, respectively.

* * * * *